United States Patent Office 3,737,497
Patented June 5, 1973

3,737,497
**METHOD FOR THE MANUFACTURE
OF PVC BOTTLES**
Wolfgang Hafner and Walter Hufnagel, St. Mang, Germany, assignors to Lever Brothers Company, New York, N.Y.
No Drawing. Continuation-in-part of application Ser. No. 91,178, Nov. 19, 1970, which is a continuation of application Ser. No. 883,667, Dec. 22, 1969, which in turn is a continuation of application Ser. No. 698,691, Jan. 18, 1968, all now abandoned. This application May 28, 1971, Ser. No. 148,157
Int. Cl. B29c *17/07*
U.S. Cl. 264—94      15 Claims

ABSTRACT OF THE DISCLOSURE

Polyvinyl chloride bottles of thin-wall construction are characterized by low oxygen and carbon dioxide permeability and a minimum amount of total additives and, in particular, a low thermal stabilizer content; in addition these bottles have improved tensile and bursting strength, elasticity, and drop resistance making them most suitable for containing oxygen sensitive and carbonated beverages. The bottles are made by forming a preform, comprising at least 70% vinyl chloride polymer material, at a temperature within the thermoplastic temperature range of the material, adjusting the temperature of the preform to within its thermoelastic range from 90° C. to 140° C., and biaxially stretching the preform by rapidly blow molding it to the dimensions of the mold achieving rates of stretch between about 100% and 1000% and above per second. Best orientation is obtained when the preform is stretched within 3 seconds and at a temperature in the thermoelastic range where the stretching capacity of the preform exceeds about 225%.

---

This is a continuation-in-part of our copending application Ser. No. 91,178 filed Nov. 19, 1970, now abandoned, which is a continuation of Ser. No. 883,667 filed Dec. 22, 1969, now abandoned, which is in turn a continuation of Ser. No. 698,691 filed Jan. 18, 1968, also abandoned.

The present invention relates to a method of preparing hollow plastic articles by blow molding a preform. More particularly, this invention relates to a method for the manufacture of polyvinyl chloride (PVC) bottles having low gas permeability and improved mechanical properties, especially improved tensile and bursting strength and elasticity.

The advantages of substituting a transparent plastic bottle for the conventional glass and metal beverage containers so as to decrease cargo weight and breakage have long been recognized. Plastics in an untreated or unfinished state are, however, permeable to gases, and, as such, beverages which are oxygen sensitive or carbonated, or both like beer, cannot be satisfactorily bottled, stored and distributed to the consumer in containers made from ordinary plastics. Past efforts to prepare a plastic bottle, particularly a PVC bottle, with suitable characteristics for containing oxygen sensitive and carbonated beverages, such as beer, have all been unsuccessful.

It is known that the mechanical properties of plastic films may be improved by orientating the molecules of the material by stretching at a raised temperature, and this is particularly so with the tensile properties in the direction of stretching. At the same time, other physical properties of the original film, for example, its electrical properties, are also modified by this orientation process. This phenomenon can be further exploited by stretching in two dimensions—sometimes referred to as biaxial orientation—with the effect of increasing the rigidity and tensile strength of the plastic film in two directions and lowering the gas permeability to some extent. It is also known that plastic material can be stretched to produce hollow bodies, such as bottles, by blow molding techniques. However, unlike the phenomenon experienced in making plastic films, no significant advance in lowering gas permeability or improving mechanical properties is achieved by simple two-dimensional blowing. To make blown bottle of polyvinyl chloride suitable for containing oxygen sensitive and carbonated beverages it has heretofore been necessary to provide an extremely heavy wall thickness or to incorporate a relatively large amount of additives into the preform material which have been found to be commercially and economically impractical. Plastics, particularly within the last decade, have been the subject of an intense effort to improve their properties by techniques similar to those used with films.

In general all macromolecular substances including plastics, such as polyvinyl chloride, when subjected to increasing temperatures pass through the so-called stages of hard-elasticity, thermoelasticity, and thermoplasticity, in that order. Within the limits of the hard-elasticity temperature range, plastic materials behave in the same way as solid bodies having a low elasticity factor such as wood, steel or ceramic bodies. The elastic behavior of these substances is generally defined by Hook's Law and their elasticity increases in direct relationship with temperature to a point of irreversibility.

Attempts have been made to achieve biaxial orientation of macromolecules through blowing in the hard-elastic range of temperatures. This procedure has the disadvantage that very high molding forces and molding tensions are necessary during the forming operation which is particularly undesirable from the economic and commercial viewpoint and in addition since the required force can damage the base materials and the product. The hollow bodies formed in the hard-elastic range are produced with an irregular wall thickness and elevated internal tension which leads to a high increase in stress cracking, a decrease in temperature resistance, and a high degree of brittleness.

In the thermoelastic range, in which high polymers behave in manner comparable to rubber, the elongation up to the point of rupture increases proportionally with increases in temperature, depending on the nature of the high polymer, and then, after reaching a specified temperature, starts decreasing as the temperature rises further. At increased temperatures, after passing through a phase of transition, plastics enter a range of plasticity in which the macromolecular material assumes the properties of a highly viscous fluid. Elongation beyond the transition phase increases considerably as the temperature is increased. The viscosity at a given temperature depends to a great extent on the nature and character of the high polymer material and, in the case of certain high polymers, also depends to a great extent on the temperature. Generally, when plastic material is stretched in the thermoplastic range, and particularly in the thermoelastic range, and then set by cooling, the process can be reversed almost completely by reheating the finished article to the stretching temperature.

Biaxial expansion or stretching of a plastic parison to improve the properties of the finished product may be achieved by blow molding within the range of temperatures at which plasticity takes place, which is for PVC at temperatures in excess of 165° C. Experience has shown that some degree of biaxial orientation or forming is relatively easy to achieve in this range of temperatures since the elongation of plastics is generally very high and is subject to relatively little influence by imprecise temperature control. Forming in the thermoplastic state can also bring about a limited orientation of the macromolecules, particularly at temperatures at the lower end of the thermoplastic scale, thus occasioning a limited improvement of the mechanical properties. The improvements achieved by blow molding in the thermoplastic temperature range are further limited since not all plastic materials can be handled in this way satisfactorily. Plastic materials such as polystyrene and polyolefines which possess particularly advantageous extension and orientation properties in this state and within this range of temperatures can be processed relatively well at this range even though their gas permeability is not improved. Polyvinyl chloride materials are difficult to convert not only due to their extreme thermosensitivity during conversion, but also due to elongation break or rupture during forming, particularly at temperatures in the thermoplastic range and specifically at the lower end of this range.

A procedure for injection-blow molding polyvinyl chloride within the thermoelastic temperature range of the preform material is described in U.S. Pat. No. 3,470,282. Accordinng to the method disclosed in this patent, a polyvinyl chloride preform or parison which has been injection molded is carefully blown at a temperature ranging from about 100° C. to about 120° C. in a two-step procedure. The parison is first stretched mechanically along its longitudinal axis and then inflated along a second axis to achieve some degree of biaxial orientation. While this procedure does blow a PVC preform at temperatures within the thermoelastic range, the controlled, two-step blow molding requires an extended blowing operation for preparing low-grade bottles in yields which are not commercially acceptable. In addition, the controlled blow molding step also restricts the use of this patent to stretching only at certain temperatures within the broad thermoelastic range range for PVC compositions. The limitation of the preform preparation solely to injection molding and the requirement of constant overall parison temperature are further drawbacks of this method.

It has now been found that hollow articles of polyvinyl chloride, particularly thin-walled bottles suitable for containing oxygen sensitive and carbonated beverages, such as beer, and other gassy liquids, may be manufactured in high yields on an industrial scale. The hollow articles prepared according to the invention are strong, yet sufficiently light in weight to be competitive on a price basis with the conventional containers, such as glass bottles and metal cans. The PCV bottles prepared may be opaque, translucent, or transparent and possess low gas, particularly oxygen and carbon dioxide, permeability and improved tensile and bursting strength and elasticity.

These objectives are accomplished by biaxially stretching a polyvinyl chloride preform by rapidly blowing it at a temperature in its thermoelastic range using high stretching rates. Vinyl chloride polymers, depending upon their formulation and their properties, achieve a maximum elongation in a narrow range of temperatures, namely between 90° C. and 140° C., within the limits of which an extremely good elongation is found to exist at a relatively low tensile strength. Temperatures between 90° C. and 140° C. do in fact comprise the entire thermoelastic range for compositions containing at least 70% vinyl chloride polymer and it has now been found that, if rapid rates of stretch are applied, the entire range is operative for blow molding PVC.

This invention is based on the surprising determination that the elongation experienced in the thermoelastic range is retained by the finished product when multiaxial orientation is carried out rapidly in the thermoelastic range of the preform at stretching rates ranging from about 100% to about 1000% and above per second. The ability to achieve high yields by blowing at such rapid rates of stretch is indeed surprising since it had heretofore been generally believed that rupture of the preform increases with shorter blowing times. The discovery that near perfect yields could be obtained by "exploding" the preform under specified conditions is, therefore, truly unexpected. As a result, high yields of perfect bottles are obtained over the entire thermoelastic range from 90° C. to 140° C., and not only a narrow portion of it. This is an essential and critical condition for the commercial exploitation of this knowledge in the manufacture of hollow polyvinyl chloride articles with improved properties. Should deviations from the optimum range of stretching speeds occur, the preforms rupture immediately and bottles cannot be inflated for multiaxial orientation, thereby adversely affecting the yield. Thus, an exact maintenance of the specified stretching rates over the entire thermoelastic temperature range is a prerequisite for the carrying out of the biaxial orientation of hollow bodies made from vinyl chloride polymers.

Accordinng to the invention, a preform is first manufactured within the thermoplastic range of the preform material from a vinyl chloride polymer formulation, preferably containing small amounts of additives, for example, by pressing, extruding, casting, or injection molding. The thermoplastic range for PVC occurs at temperatures above 165° C. and the preform is prepared at temperature ranging from 180° C. to 200° C. and preferably higher. It has been found advantageous to plasticize the raw PVC preform composition within a few seconds, preferably within 5–1 seconds or less, thereby eliminating the need for relatively high amounts of additives, particularly thermal stabilizers, which interfere with the desired orientation. The preform is brought to a temperature level within the thermoelastic range between 90° C. and 140° C., the precise temperature being dependent upon the stretching properties of the specific composition of the PVC formulation used. The preform is biaxially stretched to the dimensions of a mold by rapidly blow molding at a temperature level, between 90° C. and 140° C., where the polyvinyl chloride preform material has a stretching capacity of at least about 225%, preferably from 300% to 400%. The stretching capacity is identical with the maximum elongation at break for a specified temperature. The heated preform is rapidly blown to the desired shape by subjecting it to rates of stretch between 100% and 1000% and above per second. Stretching rates between about 200% and 600% per second are generally suitable. The desired rates of stretch may be achieved within a maximum blowing time of three seconds, and are preferably reached within about one second.

It is particularly advantageous if the blowing operation is carried out under temperatures and stretching rates such that a maximum forming tensile strength of 200 kp./cm.$^2$, preferably between 50 kp./cm.$^2$ and 120 kp./cm.$^2$, is not exceeded. By adherence to the temperatures and critical stretching rates of the invention during the biaxial orientation procedure, relatively low forming tensions, that is, low forming tensile strengths, for example maximum tensions of 200 kp./cm.$^2$, provide good forming of the material, almost complete orientation, and a considerable improvement in the physical properties of the hollow bodies being produced. Forming tensions of as low as about 100 kp./cm.$^2$ may be used to achieve elongation up to 400% and above and tensions of as low as 50 kp./cm.$^2$ are sufficient to provide adequate elongation.

The time required for stretching the hollow body at the stretching temperature depends generally upon the weight, volume, and dimensions of the body itself. In the case of bottles, such as those used particularly for carbonated beverages, the blowing time is about 3 seconds maximum and preferably the time is within about 1 second or less. It is emphasized that, in some special instances such as cases of small elongation or more sophisticated shapes, the criterion for achieving the improved results according to the invention may be the absolute blowing time in terms of seconds per bottle rather than the rates of stretch in percent per second. It is essential, in any event, to the invention that within the prescribed blowing time rates of stretch between about 100% and 1000% per second are achieved at that critical point during the blowing procedure when the preform is rapidly stretched to the mold dimensions.

The advantages of the invention can best be exploited by using vinyl chloride polymers or copolymers, or mixtures containing such polymers consisting of at least about 70% vinyl chloride polymers. The best results are obtained by the use of PVC formulations wherein the vinyl chloride polymers have K-values of 50–80, preferably between 55 and 65. It has also been proved advantageous to use vinyl chloride polymers that are substantially free of emulsifiers and those which are produced by suspension and bulk techniques. Excellent bottles having particularly low gas permeability are obtained with vinyl chloride polymers with a K-value of around 60, using temperatures ranging between about 110° C. and about 120° C. and achieving stretching rates of about 200% to 400% per second. For this formulation, an extension of 400% is attained without difficulty using forming tensions of about 60 kp./cm.$^2$.

The polyvinyl chloride compositions used in preparing good preforms are further characterized by a very low content of additives, particularly thermal stabilizers. If additives are used, they should be PVC soluble and should not affect homogeneity or, where desired, the transparency of the polyvinyl chloride. Accordingly, the preforms prepared from low-additive PVC, when stretched according to the invention, provide bottles of low gas permeability suitable for containing oxygen sensitive and carbonated beverages.

Some thermal stabilizer is ordinarily required in order to permit sufficient heating of the PVC composition for the required time, particularly during forming of the preform, without causing a resultant thermal degradation of the material. The normal amounts of thermal stabilizer effective to prevent PVC decomposition are known to interfere with the effects of biaxial stretching in lowering the gas permeability of hollow articles made from PVC compositions. According to the invention, however, the PVC material is plasticized within a few seconds preferably within 5–1 seconds or less just prior to forming the preform which is cooled immediately. Consequently, sufficient resistance against heat deterioration is obtained with unusually small amounts of stabilizer. Thus, less than 1%, and preferably less than 0.8% to 0.5%, by bottle weight of thermal stabilizer is necessary. As a result, a lower gas permeability for biaxially orientated plastic bottles is obtained than in the past. Other modifiers and additives such as lubricants, antioxidants, surfactants and extenders are also needed only in small amounts. The total amount of the additives, including the thermal stabilizer, should not exceed 2.7% by bottle weight and is preferably less than 1.5% to 1.0%.

In view of the high degree of biaxial orientation achieved and low additive content required by the present invention, PVC bottles of any weight, volume and shape can be blow molded with low oxygen and carbon dioxide permeability. For example, bottles from 20 g.–85 g. which is about the weight range for most PVC beverage containers, have according to the invention, maximum oxygen permeabilities ranging from about 6 to 12 cc./liter and maximum carbon dioxide permeabilities ranging from about 150 to 250 cc./liter during a six month storage period at ambient temperature ranging from about 20° C.–25° C. These low maximum values make the PVC bottles according to the invention particularly suitable for containing oxygen sensitive and carbonated beverages.

The following examples are intended only to illustrate the invention as previously disclosed and should not be construed to limit its scope in any way.

EXAMPLE I

A 40 g. wedge-shaped preform of polyvinyl chloride was prepared at about 190° C. having a volume of 500 cc. After setting the temperature of this preform at 100° C., it was blown to a volume of 1084 cc. under air pressure of 2 kp./cm.$^2$ in a cylindrical mold at stretching rates about 200%/sec. within about ½ sec. and subsequently cooled. During the blowing operation, the forming tension or tensile strength was about 40 kp./cm.$^2$ and the maximum elongation at break was about 450%.

The bottle prepared in this way was shown to possess substantially more favorable break resistance during drop tests in comparative tests with a bottle produced by blowing in the thermoplastic range. The average height for the drop test at which breakage took place for the invention bottle was over 250 cm., in spite of the fact that its average wall thickness was only half that of the bottle formed in the thermoplastic range which was shown to have a breaking height of only 114 cm.

The bursting resistance of the invention bottle, in spite of the increase in axial diameter and reduction of wall thickness as compared to the bottle blown in the thermoplastic ranges, remained at the same value, namely about 8 kp./cm.$^2$.

Investigations were carried out into the resistance of various zones of the orientated bottle according to the invention, the variations being due to the wedge-shaped form, in comparison with the equivalent zones of the bottle prepared in the thermoplastic range which was not orientated. The results are reported in Table A.

TABLE A

| Zone | 1 | 2 | 3 |
|---|---|---|---|
| Ratio of stretching of the orientated bottle | [1] 1.00:1.15 | [2] 1.00:1.36 | [3] 1.00:2.00 |
| Change in thickness unorientated/orientated | 1.24:1.00 | 1.34:1.00 | 1.96:1.00 |
| Tensile strength (kp./cm.$^2$.): | | | |
| Unorientated | 463 | 435 | 537 |
| Orientated + | 520 | 551 | 840 |
| Elongation at break (percent): | | | |
| Unorientted | 20 | 19 | 24 |
| Orientated + | 28 | 37 | 52 |

[1] 15%.
[2] 36%.
[3] 100%.
+ Measured around the periphery.

The comparative data reported in Table A show that the material orientated at a temperature of 100° C. and orientation speed of about 200%/sec. with a ratio of 1:2 in Zone 3, even with reduction of wall thickness, evidenced a considerable improvement in tensile strength, elasticity, bursting pressure, elongation at break and, as a result, a reduction of plastic deformation (cold flow under long-term influence of forming tension of pressurized contents). This last factor is of particular importance for the long pressure/time relation behavior of bottles filled with beverages having a $CO_2$ content, such as beer and other gassy beverages.

EXAMPLE II

The experiment reported in Example I was repeated using different stretching ratios, and in particular stretching ratios of 100% (1:2) and 300% (1:4) for Zone 3, applying various blowing times. The yield of satisfactory bottles was observed under these different conditions and the results are given in Tables B and C:

TABLE B

| | Zone | | | |
|---|---|---|---|---|
| | 1 | 2 | 3 | |
| | Rates of stretch (percent/sec.) for specified stretch ratio | | | Yield in bottles (percent) |
| Blowing time (sec.) | 15% | 36% | 100% | |
| 4 | 3.7 | 9 | 25 | 0 |
| 3 | 5 | 12 | 33 | ↑ Increase yield |
| 2 | 7.5 | 18 | 50 | |
| 1 | 15 | 36 | 100 | |
| 0.5 | 30 | 72 | 200 | |
| 0.2 | 75 | 180 | 500 | 100 |

NOTE.—Max. stretch ratio is 1:2=100%.

TABLE C

| Blowing time (sec.) | Zone | | | Yield in bottles (percent) |
|---|---|---|---|---|
| | 1 | 2 | 3 | |
| | Rates of stretch (percent/sec.) for specified stretch ratio | | | |
| | 45% | 100% | 300% | |
| 4 | 11 | 27 | 75 | 0 ⎫ |
| 3 | 15 | 36 | 100 | ⎪ Increase yield |
| 2 | 22.5 | 59 | 150 | ⎬ |
| 1 | 45 | 108 | 300 | ⎪ |
| 0.5 | 90 | 216 | 600 | 100 ⎭ |
| 0.2 | 225 | 590 | 1,500 | 100 |

NOTE.—Max. stretch ratio is 1:4=300%.

The Tables B and C show the important influence of stretching rates and forming times upon increasing the yield of bottles.

EXAMPLE III

Example I was repeated using the same blowing speed, but varying the temperature of the wedge-shaped polyvinyl chloride preform to about 110° C. The blowing pressure was 1.5 kp./cm.$^2$. The forming tension at this temperature was less than 25 kp./cm.$^2$ and the elongation at break was 240%.

EXAMPLE IV

A tubular preform based on S–PVC with a K-value of 65 was extruded at a temperature in the thermoplastic range (over 190° C.) and closed at one end. The closed preform was then cooled to 120° C. and blow molded. In the body part of the bottle, elongation of 250% was achieved in 1.2 sec. using stretching rates of about 210%/sec. The elongation of the material at this temperature was about 300% and the tensile strength was about 40 kp./cm.$^2$. In spite of the increase in volume and increase in weight in amount of product filled, as well as reduced wall thickness, the bottle produced in this way had an average breaking height, under drop test conditions, of over 2 meters and the bursting resistance amounted to some 8 kp./cm.$^2$.

EXAMPLE V

The procedure of Example IV was repeated except that the polyvinyl chloride preforms were blown at 95° C. using stretching rates of about 210%/sec. At this temperature, the elongation of the material was 350% and the tensile strength 70 kp./cm.$^2$. The bottles were blown under a pressure of about 8.5 kp./cm.$^2$. The necessary subsequent cooling in the molding form was achieved in about 5 to 7 sec.

EXAMPLE VI

Two bottles were produced from polyvinyl chloride having a K-value of 65: (a) The first was blown at a temperature of about 190° C. and a pressure of less than 1 atmosphere. At this temperature, which lies in the thermoplastic range, the tensile strength is almost zero and the maximum elongation at break is very high. (b) The second bottle was prepared from a preform at 105° C., which was, using the procedure described in the invention, biaxially stretched into its finished shape achieving stretching ratios of about 100%/sec. At this blowing temperature, the tensile strength was about 50 kp./cm.$^2$ and the maximum elongation at break was about 500%.

The results shown in Table D were obtained for tensile strength, drop test height and bursting resistance:

TABLE D

| | Bottle a | Bottle b |
|---|---|---|
| Diameter | 70 mm | 7 mm. |
| Average wall thickness | 0.5 mm | 0.5 mm. |
| Tensile strength | 500 kp./cm.$^2$ | 1,250 kp./cm.$^2$. |
| Average drop test height | 1 m. (approx.) | 3.5 m. (approx.). |
| Bursting pressure | 7 kp./cm.$^2$ | 16 kp./cm.$^2$. |
| Storage time [1] | Burst after 72 hours | No bursting after 3 months. |

[1] Storage time under the influence of pressure of 4 kp./cm.$^2$ at 20° C.

EXAMPLE VII

Example IV was repeated with a copolymer of PVC with 10% polyvinyl acetate, K-value being about 60. The preforms were, however, inflated after being cooled down to 95° C. at rates of stretch of about 210%/sec. The elongation at break of the material was 350% and the tensile strength 70 kp./sq. cm. at 95° C. The inflation of the bottle and the required cooling in the blow mold took place in a period of 5 sec. The average breaking height was above 2.1 m.

EXAMPLE VIII

Preforms having an average weight of 38 g. and a length of 152 mm. were stretched according to the invention at different temperatures. The strength was established in longitudinal and transverse directions, with 1:1.4 stretching taking place in the longitudinal direction and in transverse direction, 1:2.5. The results are reported in Table E.

TABLE E

| | Tensile strength | | Blowing pressure (atm.) |
|---|---|---|---|
| | Longitudinal (kp./cm.$^2$) | Transverse (kp./cm.$^2$) | |
| Stretching temperature (° C.): | | | |
| 100 | 610 | 880 | 5-5 |
| 110 | 630 | 980 | 3-4 |
| 120 | 630 | 923 | 2.5-3 |
| Unstretched | 430 | 500 | |

From the data in Table E it appears that for the particular PVC composition used in the experiment and a stretching ratio of 1:2.5, the optimum temperature for achieving a high tensile strength is about 110° C. A slight deviation from the optimum temperature leads to a decrease in strength.

EXAMPLE IX

A number of 0.33 liter bottles were prepared from 20 g. polyvinyl chloride preforms having a length of 152 mm. which were formed at 220° C. Each preform was biaxially orientated by blow molding at temperatures ranging from 90–95° C. The stretching ratio was varied from 100% to 400%. The stretching rates and blowing times were varied for each experiment and these conditions and the results of these experiments are reported in Table F.

TABLE F

| Blowing time (sec.) | Rates of stretch (percent/sec.) for specified stretch ratio | | | | Yield (percent) |
|---|---|---|---|---|---|
| | 100%[1] | 100%[1] | 300% | 400%[1] | |
| Unstretched | | | | | [2] 0 |
| 2.0 | 50 | 100 | 150 | 200 | 0 |
| 1.7 | 59.8 | 118 | 176 | 236 | 0 |
| 1.2 | 83.3 | 166 | 250 | 332 | [3] 0 |
| 1.0–1.1 | 100–91 | 200–182 | 300–272 | 400–364 | [4] 12 |
| 0.8 | 125 | 250 | 384 | 500 | 40 |
| 0.7 | 143 | 286 | 429 | 572 | 85 |
| 0.5 | 200 | 400 | 600 | 800 | |
| 0.4–0.5 | 250–200 | 500–400 | 750–600 | 1,000–800 | 90 |
| 0.4–0.5 | 250–200 | 500–400 | 750–600 | 1,000–800 | 97 |
| 0.4 | 250 | 500 | 750 | 1,000 | 109 |
| 0.4 | 250 | 500 | 750 | 1,000 | 100 |
| 0.3–0.4 | 333–250 | 666–500 | 1,000–750 | 1,332–1,000 | 100 |

[1] Calculated.
[2] Only burst preforms.
[3] Irregular burst bodies (not blown out).
[4] (24%) percentage not well-formed.

The results shown in Table F indicate that, for preparing satisfactory 0.33 liter bottles, at blowing times of less than 1 second, and preferably between about 0.4–0.5 second, and at rates of stretch exceeding about 100%/sec., for 100%–400% stretching ratio, the yield of perfect bottles increases to about 100%. It has been found that an increase in bottle volume, weight, formulation and dimension brings with it an increase in the minimum essential blowing time.

EXAMPLE X

A 330 cc. PVC bottle having a weight of 20 g., containing 0.4% stabilizer and a total amount of 1.5% additives, was prepared according to the invention. The oxygen permeability of this bottle was found to be 3 cc. during a storage period of 6 months at 20° C. The $CO_2$ permeation was 80 cc. during storage under the same conditions.

Thus, according to the invention, hollow polyvinyl chloride articles, such as bottles, suitable for containing beer and other oxygen sensitive beverages and gassy liquids, are provided which have extraordinary low gas permeability, and improved tensile and bursting strength, drop resistance, and elasticity, while at the same time are unusually light in weight as compared with glass and other plastic bottles.

Many variations of the present invention will readily suggest themselves to those skilled in the art. None of these variations, however, should limit the scope of the invention as defined by the following claims.

We claim:
1. A method for manufacturing hollow articles from polyvinyl chloride by blow molding techniques which comprises the steps of
   (a) forming a preform of polyvinyl chloride at a temperature within the thermoplastic temperature range of the polymer;
   (b) adjusting the preform to a temperature within the thermoelastic range from 90° C. to 140° C. at which the stretching capacity of the preform is at least 225%;
   (c) maintaining the thermoelastic temperature and biaxially stretching the preform to the dimensions of a mold by rapidly blowing within a maximum blowing time of three seconds at rates of stretch of at least about 100%/second; and
   (d) subsequently cooling the finished article to set.
2. A method according to claim 1 wherein the preform is maintained for blowing at a temperature at which the stretching capacity of the preform is between 300% and 400%.
3. A method according to claim 1 wherein the preform is rapidly blown within a maximum blowing time of 1 second.
4. A method according to claim 1 wherein the preform is blow molded at rates of stretch between about 200% and 600%/sec.
5. A method for manufacturing hollow articles according to claim 1 wherein the preform material is selected from the group consisting of polyvinyl chloride, and a mixture of such polymers containing at least 70% polyvinyl chloride.
6. A method according to claim 1 wherein the polyvinyl chloride is substantially free of emulsifiers.
7. A method according to claim 1 wherein the preform contains less than 1.5% total additives and less than 1% thermal stabilizer.
8. A method according to claim 7 wherein the preform contains less than 1.3%–1.0% total additives and less than 0.8%–0.5% thermal stabilizer.
9. A method according to claim 1 wherein the preform is prepared by injection molding.
10. A method according to claim 1 wherein the preform is prepared by plasticizing the PVC material within 5 seconds or less at a temperature within the thermoplastic range exceeding 165° C.
11. A method according to claim 10 wherein the preform is prepared at a temperature within the thermoplastic range from 180° C. to 200° C.
12. A method according to claim 1 wherein biaxial stretching is carried out at a temperature and rates of stretch where the maximum forming tensile strength is not greater than 200 kp./cm.$^2$.
13. A method according to claim 11 wherein the maximum forming tensile strength is not greater than from 50 to 120 kp./cm.$^2$.
14. A method according to claim 1 wherein said polyvinyl chloride has a K-value ranging from 50 to 80.
15. A method according to claim 1 wherein the polyvinyl chloride has a K-value of about 60 and the preform is biaxially stretched by rapidly blow molding at a temperature between about 110° C. and 120° C. and at rates of stretch from about 200% to 400%/sec.

References Cited

UNITED STATES PATENTS

| | | | |
|---|---|---|---|
| 3,231,642 | 1/1966 | Goldsan et al. | 264—95 |
| 3,337,666 | 8/1967 | Wilkins | 264—97 |
| 3,412,188 | 11/1968 | Seefluth | 264—97 X |

FOREIGN PATENTS

| | | | |
|---|---|---|---|
| 621,304 | 2/1963 | Belgium | 264—95 |
| 930,323 | 7/1963 | Great Britain | 264—95 |
| 1,194,560 | 6/1965 | Germany | 264—95 |
| 1,387,773 | 4/1964 | France | 264—95 |

ROBERT E. WHITE, Primary Examiner

J. H. SILBAUGH, Assistant Examiner

U.S. Cl. X.R.

264—97, 98

UNITED STATES PATENT AND TRADEMARK OFFICE
CERTIFICATE OF CORRECTION

PATENT NO. : 3,737,497
DATED : June 5, 1973
INVENTOR(S) : Wolfgang Hafner and Walter Hufnagel It is certified that error appears in the above-identified patent and that said Letters Patent are hereby corrected as shown below:

Column 3, line 36, delete "range" (second occurrence). Column 3, line 47, "PCV" should read --PVC--. Column 4, line 7, "polyvinnyl" should read --polyvinyl--. Column 6, line 37, "Unorientted" should read --Unorientated--. Column 6, Table B, lines 70-75, "increase" should read --increasing--. Column 7, Table C, lines 8-13, "increase" should read --increasing--. Column 8, Table F, "100%" (second occurrence) should read --200%--. Column 8, Table F, Last Column, "90" should read --97--. Column 8, Table F, Last Column, "97" should read --99--. Column 8, Table F, Last Column, "109" should read --100--.

Signed and Sealed this twenty-third Day of March 1976

[SEAL]

Attest:

RUTH C. MASON
Attesting Officer

C. MARSHALL DANN
Commissioner of Patents and Trademarks